United States Patent [19]

Kennedy et al.

[11] Patent Number: 5,119,382
[45] Date of Patent: Jun. 2, 1992

[54] TETRAVALENT CHROMIUM DOPED PASSIVE Q-SWITCH

[75] Inventors: Chandler J. Kennedy, Town & Country; Donna M. Andrauskas, St. Peters, both of Mo.

[73] Assignee: McDonnell Douglas Corporation, St. Louis, Mo.

[21] Appl. No.: 632,974

[22] Filed: Dec. 24, 1990

[51] Int. Cl.$^5$ ............................................... H01S 3/113
[52] U.S. Cl. ...................................................... 372/11
[58] Field of Search ................................. 372/10, 11, 9

[56] References Cited

U.S. PATENT DOCUMENTS 4,723,248  2/1988  Harter et al. ........................ 372/11
4,987,575  1/1991  Alfano et al. ........................ 372/41

Primary Examiner—William L. Sikes
Assistant Examiner—Morse Susan S.
Attorney, Agent, or Firm—Guy R. Gosnell; Timothy H. Courson; Benjamin Hudson, Jr.

[57] ABSTRACT

There is provided by this invention a laser cavity for producing a periodic output pulse and a passive Q-switch for use therein. The laser cavity is typically comprised of a lasing medium, a pair of reflecting elements, and a passive Q-switch. The Q-switch is composed of inorganic, solid-state materials which do not degrade through use. Exemplary materials include a Q-switch constructed from a host material having a tetrahedral site, such as GSAG ($Gd_3Sc_2Al_3O_{12}$), GIGG ($Gd_3In_2Ga_3O_{12}$), YAG ($Y_3Al_5O_{12}$), or $Mg_2SiO_4$ into which tetravalent chromium ($Cr^{4+}$) is introduced as a dopant material. The passive Q-switch composed of such materials effectively modulates laser output having a wavelength within the range of 850 nanometers to 1250 nanometers.

18 Claims, 1 Drawing Sheet

TETRAVALENT CHROMIUM DOPED PASSIVE Q-SWITCH

BACKGROUND OF THE INVENTION

1. Field of the Invention

The present invention relates generally to Q-switches for use in laser cavities and more particularly to passive Q-switches composed of members of the garnet family containing tetravalent chromium, $Cr^{4+}$, dopant material.

2. Description of the Prior Art

In many modern laser applications, it is desirable for the laser cavity to produce periodic laser pulses each having a high peak power instead of more numerous, but lower powered, laser pulses. An example of such an application is the use of periodic, high power laser output pulses in the laser communication field.

In a laser cavity, a Q-switch is used to produce periodic laser pulses with high peak output powers. The function of a Q-switch is to prevent lasing in a laser oscillator while the gain medium is being pumped above the threshold value for lasing. Typically, one of three methods is used to prevent lasing: enhancement of output coupling, misalignment of resonator optics, and absorption of the lasing wavelength. These three methods for preventing lasing must then quickly change states to return the output coupling to near optimal values, align the resonator optics, and reduce the absorbance, respectively, in order to return the laser to an above-threshold condition which allows increased oscillation.

Q-switches are typically classified as either active or passive. Active Q-switches require electrical stimulation in order to function properly while passive Q-switches do not require electrical stimulation for proper operation. Therefore, passive Q-switches are desirable in many applications where additional electronic circuitry and the associated control system are not desired or may prove to be unreliable or inefficient.

Saturable absorbers, a type of passive Q-switch, utilize absorption of the lasing wavelength to prevent lasing within the laser cavity. Saturable absorbers switch states, from a state of preventing lasing to one of permitting lasing, due to transient bleaching of the absorbant material which occurs when the laser gain exceeds the net losses in the resonator, including the absorption of the Q-switch.

Typical passive Q-switches that are saturable absorbers include dyes, dye films and crystals that contain saturable color center defects. As previously discussed, these types of Q-switches are designed to exhibit an absorptivity which decreases with increasing irradiance. However, each of these Q-switches suffers from deficiencies which limit its utility. Dyes and dye films undergo degradation of the dye due to the decomposition of the long-chain dye molecules. Additionally, dye and dye film Q-switches require consistent maintenance due to decreases in the optical density of the dye which occur even while the dye is housed in the dark. A decrease in optical density of the dye alters the Q-switch properties and thus degrades the performance of the laser cavity. The index of refraction of the dyes may also change as the light intensity to which the dye is exposed increases. For example, as the laser power increases, the core of the dye through which the laser light will pass has a higher index of refraction than the exterior of the dye, thus resulting in an alteration of the Q-switch properties which degrades the performance of the laser cavity. Dyes also lack an efficient means of heat dissipation such that the thermal state of the dye may be altered during its operation in a laser cavity and thus further degrade the performance of the laser cavity.

Dye films suffer from several unique deficiencies including the flexibility of typical dye films. This flexibility necessitates the bonding of the dye film between two pieces of glass in order to prevent the dye film from bending and distorting the optical density of the film. Thus, more intricate manufacturing processes are required in order to properly bond the dye film. Furthermore, the index of refraction of dye films may vary due to changes in the temperature of the dye film so as to result in inaccurate saturable absorber behavior.

Passive Q-switches constructed from crystals containing saturable color center defects also suffer from deficiencies such as fading of the color center which in turn, causes loss of the saturable absorber characteristics which will degrade the laser performance when the Q-switch is continuously operated for several hours. Additionally, the crystals from which the Q-switch is constructed are typically rather long, such as 5 cm for a LiF crystal. Thus, the length of the crystals may restrict the use of the Q-switch in compact laser cavities.

In order to eliminate the degradation of the Q-switch properties which occur with the passage of time or exposure to laser light in the aforementioned Q-switches, inorganic solid-state materials have been utilized to provide the necessary Q-switching without experiencing the degradation noted in the other Q-switches. However, inorganic, solid-state materials have thus far been limited to use in lasing devices which incorporate both the active medium and the passive Q-switch within one device. Such a device is therefore a self-Q-switching laser. Self-Q-switching lasers suffer from several inherent limitations, including the inability to adjust the density of the dopant ions in the Q-switch to maximize its Q-switching performance without considering the corresponding effects which the dopant density change will have on the active medium's performance.

A typical self-Q-switching laser is illustrated in the article entitled, "Compact $GSGG:Cr^{3+}:Nd^{3+}$ Laser with Passive Q Switching", published in May 1987 by A. A. Danilov, et al. in the Soviet Journal of Quantum Electronics, Volume 17(5), pages 573-574. The article discloses a flashlamp-pumped laser made of a gadolinium scandium gallium garnet ($Gd_3Sc_2Ga_3O_{12}$ or GSGG) crystal activated with trivalent chromium and trivalent neodymium ($GSGG:Cr^{3+}:Nd^{3+}$) which has both an active medium and a passibe Q-switch contained within the one device. While the laser diclosed may not suffer from the degradation of the Q-switching properties previously discussed, the device suffers from several deficiencies and limitations. One such deficiency is the limitation imposed upon a laser system in which the same device contains both the active medium and the passive Q-switch. The laser system is thus restricted to particular types of lasing elements, since only lasing elements which can accommodate the materials required for passive Q-switching may be selected. Furthermore, the wavelengths at which the laser may be operated are limited to those supported by both the active medium and the passive Q-switch. Also, as the absorption at the chosen wavelength is increased to enhance the Q-switch behavior, the laser performance is correspondingly degraded.

It would be desirable to develop a passive Q-switch, requiring no electrical contact, which does not suffer from degradation due to the passage of time or exposure to the laser light. Additionally, it would be desirable to develop a passive Q-switch which is distinct from the active medium such that the Q-switch and the lasing medium can be individually selected or altered in order to optimize the entire laser system's performance as well as to provide operation over a broader frequency range.

SUMMARY OF THE INVENTION

There is provided by this invention a laser cavity for producing a periodic output pulse and a passive Q-switch for use therein. The laser cavity is typically comprised of a lasing medium, a pair of reflecting elements, and a passive Q-switch. The Q-switch is composed of inorganic, solid-state materials which do not degrade through use. Exemplary materials include a Q-switch constructed from a host material having a tetrahedral site, such as GSAG ($Gd_3Sc_2Al_3O_{12}$), GIGG ($Gd_3In_2Ga_3O_{12}$), YAG ($Y_3Al_5O_{12}$), or $Mg_2SiO_4$ into which tetravalent chromium ($Cr^{4+}$) is introduced as a dopant material. The passive Q-switch composed of such materials effectively modulates laser output having a wavelength within the range of 850 nanometers to 1250 nanometers.

DETAILED DESCRIPTION OF THE PREFERRED EMBODIEMENT

Figure 1:
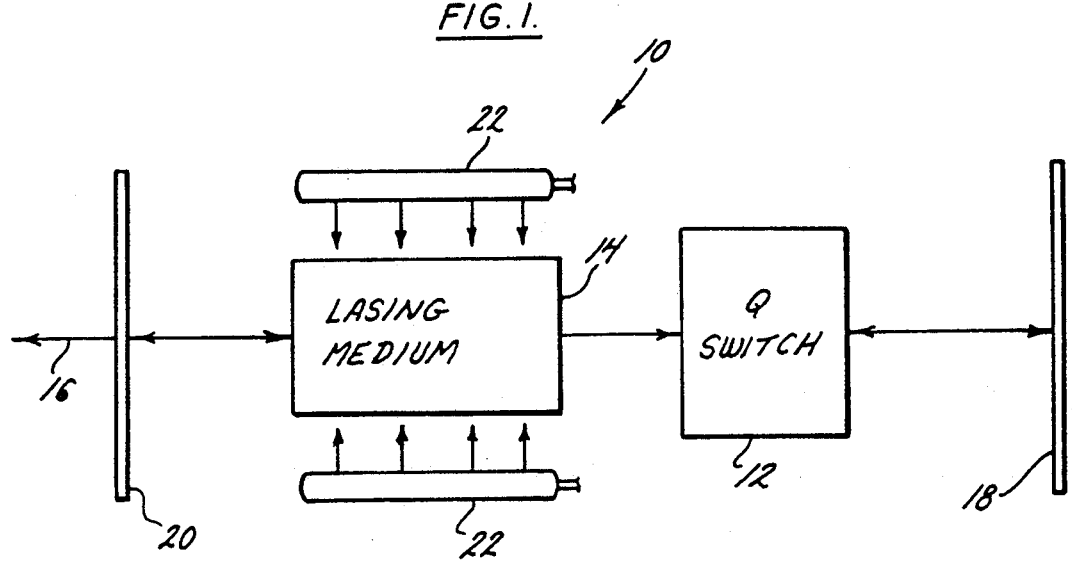
FIG. 1 is a side view of a laser cavity incorporating a tetravalent chromium solid-state passive Q-switch.

A laser cavity 10 utilizing a tetravalent chromium solid-state passive Q-switch 12 is illustrated in FIG. 1. The laser cavity 10 is typically comprised of a lasing element 14 which is Q-switched to provide periodic high power output pulses 16. The laser cavity 10 is further defined by a pair of reflecting elements. A first reflecting element 18 may be totally reflective, while the second reflecting element 20 may be partially reflective so as to emit the output pulse 16 from the laser cavity 10.

The lasing element 14 may be pumped by a flashlamp 22 as illustrated in FIG. 1 or, alternatively, by a laser diode array so that a sufficient population inversion is established to support lasing. Suitable lasing elements include those composed of Nd:YAG, Nd:glass, Nd,Cr:GSGG, and Nd,Cr:YAG The solid-state Q-switch 12 is a passive device which does not require electrical stimulation in order to modulate the lasing element's output. The Q-switch is composed of a host material that is activated by the presence of tetravalent chromium ($Cr^{4+}$). The host material must be a structure containing a tetrahedral site within its geometry. Examples of such structures are members of the garnet family of materials, such as GSAG ($Gd_3Sc_2Al_3O_{12}$), GIGG ($Gd_3In_2Ga_3O_{12}$), and Yag ($Y_3Al_5O_{12}$). Another example of such a host material is $Mg_2SiO_4$.

GSAG and GIGG are both cubic structures which have tetrahedral site symmetry. The tetravalent chromium occupies the tetrahedral site within the structure. Additionally, GSAG and GIGG have octahedral and dodecahedral sites which may be occupied by trivalent chromium ($Cr^{3+}$) and neodymium, respectively. GSAG and GIGG doped with tetravalent chromium are highly stable and behave predictably due in large part to the electrons half-filling the outer energy level of the crystal.

The absorption spectrum of GSAG or GIGG doped with tetravalent chromium is broad, absorbing light with wavelengths of approximately 850 to 1250 nanometers. Consequently, the structure of GSAG or GIGG doped with tetravalent chromium has been shown to passively Q-switch at 1053 nanometers, 1061 nanometers, and 1064 nanometers; wavelengths in the middle of the aforementioned absorption spectrum.

Q-switches constructed from tetravalent chromium doped GSAG or GIGG maintain consistent performance over time so that the degradation apparent in prior art Q-switches is not apparent. In contrast to prior art self-Q-switching laser devices, the GSAG or GIGG Q-switches doped with tetravalent chromium are a separate component of a laser cavity and thus may be used with various lasing mediums, including Nd:YAG and Nd:glass, and may be optimized separately from the lasing medium so as to increase the performance characteristics of the laser cavity.

Figure 2:
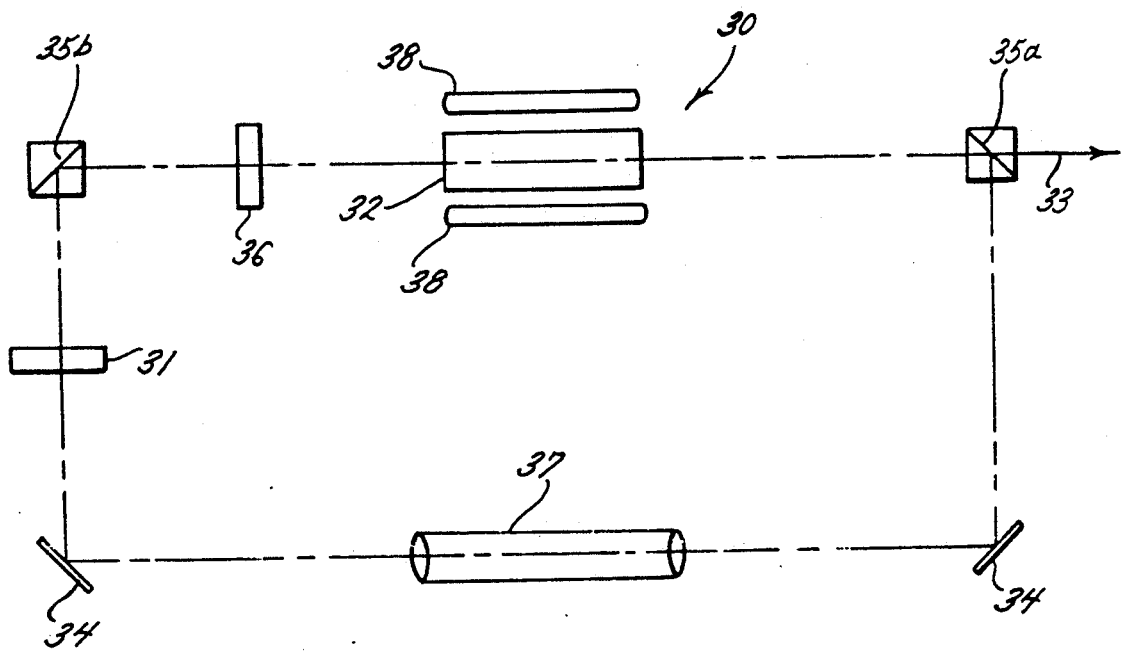
FIG. 2 is a side view of a telescopic ring resonator laser cavity incorporating a tetravalent chromium solid-state passive Q-switch.

While the Q-switch has been heretofore discussed in conjunction with a linear resonator as shown in FIG. 1, the Q-switch may also be utilized in other laser cavities well known to those skilled in the art, such as a telescopic ring resonator laser cavity 30 as shown in FIG. 2. A tetravalent chromium doped solid-state passive Q-switch 31 is shown in a telescopic ring resonator cavity 30 in FIG. 2. In addition to a Q-switch, the telescopic ring resonator cavity 30 is typically comprised of a lasing element 32, a pump source 38, two reflective elements 34, two polarizing beamsplitters 35, a half-wave plate 36, and a telescope 37 which in turn is comprised of at least two lenses. The two reflective elements 34 may be totally reflective and serve to define the laser cavity 30. The telescope 37 is chosen to optimize and stabilize the laser beam. The two polarizing beamsplitters 35, in conjunction with the half-wave plate 36, are designed to optimize the transmission of output pulses 33 in the forward direction, rather than having output pulses in both the forward and reverse directions. For purposes of this exemplary laser cavity 30, the forward direction is defined to extend from the lasing element 32 through the forward beamsplitter 35a, while the reverse direction is defined to extend from the lasing element 32 through the half-wave plate 36 and the rear beamsplitter 35b.

As previously discussed with respect to the laser cavity 10 in FIG. 1, the lasing element 32 may be flashlamp-pumped as shown in FIG. 2, or, alternatively, may be pumped by a laser diode array, as long as a sufficient population inversion to support lasing is established. Suitable lasing elements include those composed of Nd:YAG, Nd:glass, Nd,Cr:GSGG, and Nd,Cr:YAG. The solid-state Q-switch 31, a passive device serving to modulate the lasing element's output, is composed of a host material, containing a tetrahedral site within its geometry, which is activated by the presence of tetravalent chromium ($Cr^{4+}$). Exemplary host materials include GSAG ($Gd_3Sc_2Al_3O_{12}$), GIGG ($Gd_3In_2Ga_3O_{12}$), YAG ($Y_3Al_5O_{12}$), and $Mg_2SiO_4$.

Although there has been illustrated and described specific detail and structure of operations, it is clearly understood that changes and modifications may be readily made therein by those skilled in the art without departing from the spirit and the scope of the invention.

We claim:

1. A laser cavity for producing a pulsed laser output, comprising:
   a) a lasing medium disposed within the laser cavity;
   b) a means for exciting the lasing medium to emit coherent radiation;
   c) a first reflecting element forming a first end of the laser cavity for reflecting the coherent radiation;
   d) a second reflecting element forming a second end of the laser cavity for partially reflecting the coherent radiation and for partially transmitting the coherent radiation; and
   e) a passive Q-switch composed of a host material having a tetrahedral site with a tetravalent chromium dopant material for modulating the coherent radiation.

2. A laser cavity as recited in claim 1, wherein the coherent radiation has a wavelength of 850 nanometers to 1250 nanometers.

3. A laser cavity as resited in claim 2, wherein the host material of the passive Q-switch is $Gd_3Sc_2Al_3O_{12}$.

4. A laser cavity as recited in claim 3, wherein said lasing medium is selected from the group consisting of Nd:YAG, Nd:glass, Nd,Cr:YAG, and Nd,Cr:GSGG.

5. A laser cavity as recited in claim 2, wherein the host material of the passive Q-switch is $Gd_3In_2Ga_3O_{12}$.

6. A laser cavity as recited in claim 5, wherein said lasing medium is selected from the group consisting of Nd:YAG, Cr,Nd:GSGG, Cr,Nd:YAG, and Nd:glass.

7. A laser cavity as recited in claim 2, wherein the host material of the passive Q-switch is $Mg_2SiO_4$.

8. A laser cavity for producing a pulsed laser output, comprising:
   a) a lasing medium, having a first end and a second end, disposed within the laser cavity;
   b) a means for exciting the lasing medium to emit coherent radiation;
   c) two reflecting elements for reflecting the coherent radiation;
   d) a first polarizing beam splitting means positioned to partially transmit coherent radiation emitted from the first end of the lasing medium;
   e) a means for altering the polarization of the coherent radiation emitted from the second end of the lasing medium;
   f) a second polarizing beam splitting means for reflecting radiation whose polarization has been altered; and
   g) a passive Q-switch composed of a host material having a tetrahedral site with a tetravalent chromium dopant material for modulating the coherent radiation; said Q-switch positioned between the second polarizing beam splitting means and a first reflecting element.

9. The laser cavity as recited in claim 8, further comprising a telescope positioned between the two reflecting elements; said telescope comprising at least two lenses for stabilizing the radiation.

10. A laser cavity as recited in claim 9, wherein the coherent radiation has a wavelength of 850 nanometers to 1250 nanometers.

11. A laser cavity as recited in claim 10, wherein the host material of the passive Q-switch is $Gd_3Sc_2Al_3O_{12}$.

12. A laser cavity as recited in claim 11, wherein said lasing medium is selected from the group consisting of Nd:YAG, Nd:glass, Nd,Cr:YAG, and Nd,Cr:GSGG.

13. A laser cavity as recited in claim 10, wherein the host material of the passive Q-switch is $Gd_3In_2Ga_3O_{12}$.

14. A laser cavity as recited in claim 13, wherein said lasing medium is selected from the group consisting of Nd:YAG, Cr,Nd:GSGG, Cr,Nd:YAG, and Nd:glass.

15. A laser cavity as recited in claim 10, wherein the host material of the passive Q-switch is $Mg_2SiO_4$.

16. A passive Q-switch, comprising:
   a) a host material selected from the group consisting of $Gd_3Sc_2Al_3O_{12}$ and $Gd_3In_2Ga_3O_{12}$; and
   b) a tetravalent chromium dopant material.

17. A passive Q-switch as recited in claim 16, further comprising:
   a) a trivalent chromium dopant material; and
   b) a neodymium dopant material.

18. A passive Q-switch, comprising:
   a) a host material selected from the group consisting of $Mg_2SiO_4$ and $Y_3Al_5O_{12}$; and
   b) a tetravalent chromium dopant material.

* * * * *

(12) EX PARTE REEXAMINATION CERTIFICATE (5375th)
United States Patent
Kennedy et al.

(10) Number: US 5,119,382 C1
(45) Certificate Issued: May 23, 2006

(54) TETRAVALENT CHROMIUM DOPED PASSIVE Q-SWITCH

(75) Inventors: Chandler J. Kennedy, Town & Country, MO (US); Donna M. Andrauskas, St. Peters, MO (US)

(73) Assignee: McDonnell Douglas Corporation

Reexamination Request:
No. 90/006,340, Jul. 31, 2002

Reexamination Certificate for:
Patent No.: 5,119,382
Issued: Jun. 2, 1992
Appl. No.: 07/632,974
Filed: Dec. 24, 1990

(51) Int. Cl.
*H01S 3/113* (2006.01)

(52) U.S. Cl. .................................................. 372/11
(58) Field of Classification Search ............... 372/9–11
See application file for complete search history.

(56) References Cited

U.S. PATENT DOCUMENTS 4,796,262 A * 1/1989 Michelangeli et al. ......... 372/9
4,837,769 A * 6/1989 Chandra et al. ............... 372/41
4,932,031 A * 6/1990 Alfano et al. ................ 372/41

OTHER PUBLICATIONS

Stokowski et al., "Growth and Characterization of Large Nd, Cr:GSGG Crystals for High–Average–Power Slab Lasers," IEEE Journal of Quantum Electronics, vol. 24, No. 6, Jun. 1988, pp. 934–948.*

Zharikov et al., "Use of GSGG:Cr:Nd crystals with photochromic centers as active elements in solid lasers," Soviet Journal of Quantum Electronics, vol. 16, No. 11, Nov. 1986, pp. 1552–1554.*

Danilov et al., "Compact GSGG:Cr3+:Nd3+ laser with passive Q switching," Soviet Journal of Quantum Electronics, vol. 17, No. 5, May 1987, pp. 573–574.*

Danilov et al., "Self–Q–switched high–power laser utilizing gadolinium scandium aluminum garnet activated with chromium and neodymium," Soviet Journal of Quantum Electronics, vol. 19, No. 3, Mar. 1989, pp. 315–316.*

"Growth and Characterization of Large Nd, Cr:GSGG Crystals for High–Average–Power Slab Lasers", Stokowski et al., IEE Journal of Quantum Electronics, vol. 24, No. 6, Jun. 1988.

* cited by examiner

*Primary Examiner*—James A. Menefee

(57) ABSTRACT

There is provided by this invention a laser cavity for producing a periodic output pulse and a passive Q-switch for use therein. The laser cavity is typically comprised of a lasing medium, a pair of reflecting elements, and a passive Q-switch. The Q-switch is composed of inorganic, solid-state materials which do not degrade through use. Exemplary materials include a Q-switch constructed from a host material having a tetrahedral site, such as GSAG ($Gd_3Sc_2Al_3O_{12}$), GIGG ($Gd_3In_2Ga_3O_{12}$), YAG ($Y_3Al_5O_{12}$), or $Mg_2SiO_4$ into which tetravalent chromium ($Cr^{4+}$) is introduced as a dopant material. The passive Q-switch composed of such materials effectively modulates laser output having a wavelength within the range of 850 nanometers to 1250 nanometers.

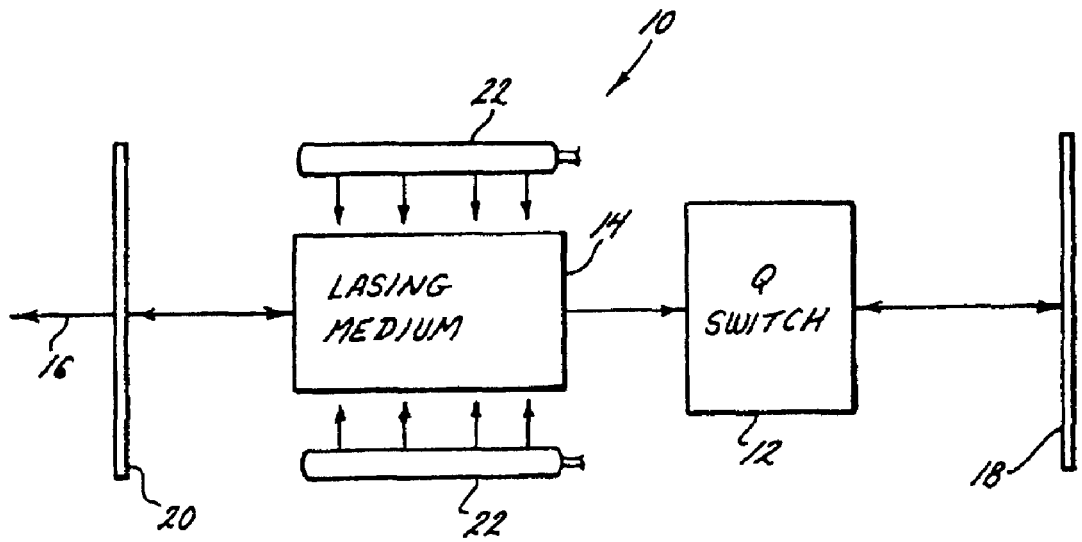

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

\* \* \* \* \*

(12) EX PARTE REEXAMINATION CERTIFICATE (6389th)
United States Patent
Kennedy et al.

(10) Number: US 5,119,382 C2
(45) Certificate Issued: Aug. 19, 2008

(54) TETRAVALENT CHROMIUM DOPED PASSIVE Q-SWITCH

(75) Inventors: Chandler J. Kennedy, Town & Country, MO (US); Donna M. Andrauskas, St. Peters, MO (US)

(73) Assignee: McDonnell Douglas Corporation, St. Louis, MO (US)

Reexamination Request:
No. 90/007,762, Oct. 12, 2005

Reexamination Certificate for:
Patent No.: 5,119,382
Issued: Jun. 2, 1992
Appl. No.: 07/632,974
Filed: Dec. 24, 1990

Reexamination Certificate C1 5,119,382 issued May 23, 2006

(51) Int. Cl.
*H01S 3/11* (2006.01)
*H01S 3/113* (2006.01)

(52) U.S. Cl. ............................................. 372/11
(58) Field of Classification Search .................. 372/10, 372/11
See application file for complete search history.

(56) References Cited

U.S. PATENT DOCUMENTS 4,796,262 A    1/1989   Michelangeli et al.
4,837,769 A *  6/1989   Chandra et al. ............... 372/41
4,987,575 A    1/1991   Alfano et al.

OTHER PUBLICATIONS

S.A. Vasina et al., A New Stable Passive Q Switch for a Neodymium Laser, Zhurnal Prikladnoi Spektroskopii, vol. 24, No. 6 (Jun. 1976).*
"Phototropic Centers in Chromium–Doped Garnets," Krutova, et al., *Opt. Spectrosc.* (USSR) 63(5), Nov. 1987.
"Growth and Characterization of Large Nd, Cr:GSGG Crystals for High–Average–Power Slab Lasers," Stokowski, et al., *IEEE Journal of Quantum Electronics*, vol. 24, No. 6, Jun. 1988.

* cited by examiner

*Primary Examiner*—James Menefee

(57) ABSTRACT

There is provided by this invention a laser cavity for producing a periodic output pulse and a passive Q-switch for use therein. The laser cavity is typically comprised of a lasing medium, a pair of reflecting elements, and a passive Q-switch. The Q-switch is composed of inorganic, solid-state materials which do not degrade through use. Exemplary materials include a Q-switch constructed from a host material having a tetrahedral site, such as GSAG ($Gd_3Sc_2Al_3O_{12}$), GIGG ($Gd_3In_2Ga_3O_{12}$), YAG ($Y_3Al_5O_{12}$), or $Mg_2SiO_4$ into which tetravalent chromium ($Cr^{4+}$) is introduced as a dopant material. The passive Q-switch composed of such materials effectively modulates laser output having a wavelength within the range of 850 nanometers to 1250 nanometers.

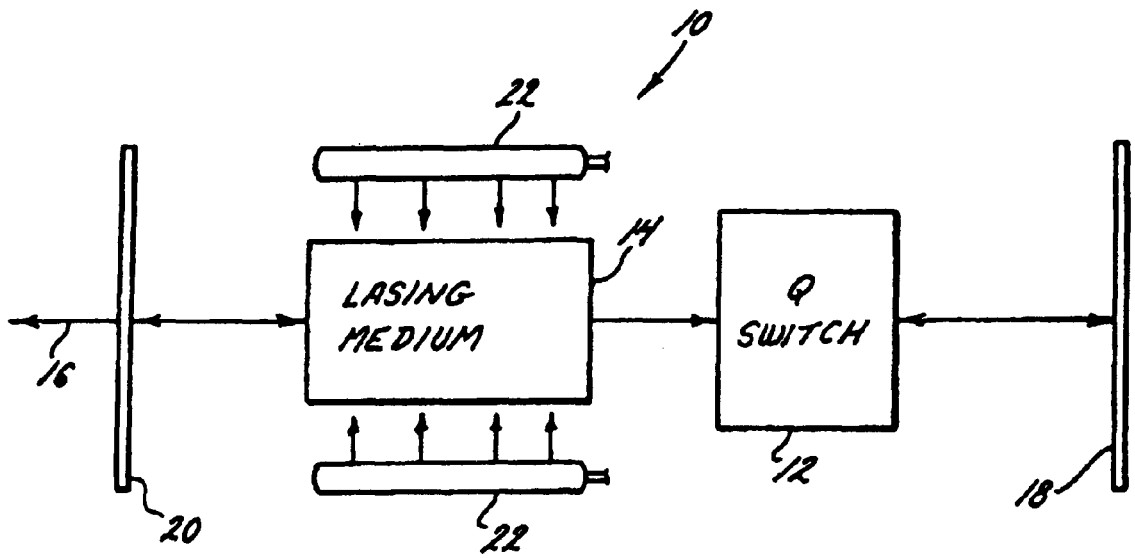

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8–15 is confirmed.

Claims 1–4, 16 and 18 are cancelled.

Claims 5, 7 and 17 are determined to be patentable as amended.

Claim 6, dependent on an amended claim, is determined to be patentable.

5. A laser cavity [as recited in claim 2.] *for producing a pulsed laser output, comprising:*
   *a) a lasing medium disposed within the laser cavity;*
   *b) a means for exciting the lasing medium to emit coherent radiation;*
   *c) a first reflecting element forming a first end of the laser cavity for reflecting the coherent radiation;*
   *d) a second reflecting element forming a second end of the laser cavity for partially reflecting the coherent radiation and for partially transmitting the coherent radiation; and*
   *e) a passive Q-switch composed of a host material having a tetrahedral site with a tetravalent chromium dopant material for modulating the coherent radiation, wherein the coherent radiation has a wavelength of 850 nanometers to 1250 nanometers and* wherein the host material of the passive Q-switch is $Gd_3In_2Ga_3O_{12}$.

7. A laser cavity [as recited in claim 2] *for producing a pulsed laser output, comprising:*
   *a) a lasing medium disposed within the laser cavity;*
   *b) a means for exciting the lasing medium to emit coherent radiation;*
   *c) a first reflecting element forming a first end of the laser cavity for reflecting the coherent radiation;*
   *d) a second reflecting element forming a second end of the laser cavity for partially reflecting the coherent radiation and for partially transmitting the coherent radiation; and*
   *e) a passive Q-switch composed of a host material having a tetrahedral site with a tetravalent chromium dopant material for modulating the coherent radiation, wherein the coherent radiation has a wavelength of 850 nanometers to 1250 nanometers and* wherein the host material of the passive Q-switch is $Mg_2SiO_4$.

17. A passive Q-switch [as recited in claim 16, further] comprising:
   *a) a host material selected from the group consisting of Gd3Sc2Al3O12 and Gd3In2Ga3O12; and*
   *b) a tetravalent chromium dopant material;*
   [a] *c)* a trivalent chromium dopant material; and
   [b] *d)* a neodymium dopant material.

* * * * *